United States Patent [19]
Reddig

[11] Patent Number: 5,179,401
[45] Date of Patent: Jan. 12, 1993

[54] PHOTOGRAPHIC CAMERA WITH WEDGE-SHAPED BODY PORTION AND MATCHING FLASH

[75] Inventor: Alan G. Reddig, Rochester, N.Y.

[73] Assignee: Eastman Kodak Company, Rochester, N.Y.

[21] Appl. No.: 670,647

[22] Filed: Mar. 18, 1991

[51] Int. Cl.⁵ .................. G03B 15/03; G03B 17/02
[52] U.S. Cl. ........................ 354/149.11; 354/288
[58] Field of Search .............. 354/149.11, 81, 82, 354/126, 145.1, 187, 288

[56] References Cited

U.S. PATENT DOCUMENTS

| | | | |
|---|---|---|---|
| 3,286,611 | 11/1966 | Lange | 95/149.11 |
| 4,068,245 | 1/1978 | Ohtaki et al. | 354/149.1 |
| 4,269,498 | 3/1981 | Suzuki et al. | 354/288 |
| 4,350,420 | 9/1982 | Engelsmann et al. | 354/149.11 X |
| 4,688,913 | 8/1987 | Whiteside et al. | 354/149.11 |

FOREIGN PATENT DOCUMENTS

| | | |
|---|---|---|
| 275089A | 7/1988 | European Pat. Off. |
| 51-54632 | 4/1976 | Japan |
| 63-271327 | 11/1988 | Japan |

Primary Examiner—Michael L. Gellner
Assistant Examiner—J. K. Han
Attorney, Agent, or Firm—Roger A. Fields

[57] ABSTRACT

In a photographic camera, a flash unit is pivotable about an axis extending through the top and bottom faces of the camera body between a storage position integrated with a wedge-shaped end portion of the body and an operative position protruding forward of the front face of the body.

6 Claims, 2 Drawing Sheets

PHOTOGRAPHIC CAMERA WITH WEDGE-SHAPED BODY PORTION AND MATCHING FLASH

BACKGROUND OF THE INVENTION

1. Field of the Invention

The invention relates generally to the field of photography, and in particular to a still-picture camera having a pivotable flash unit.

2. Description of the Prior Art

A current trend in camera design is to incorporate an electronic flash unit in the camera body and yet make the body relatively pleasing in appearance. By way of example, U.S. Pat. No. 3,286,611, issued Nov. 22, 1966, discloses a still-picture camera in which a flash unit is mounted for swinging movement relative to the camera body about a pivot axis extending through the top and bottom faces of the body. The flash unit is fitted to the camera body for movement between a storage or folded position and an operative or working position. In the storage position, the flash unit conforms to the contour of the camera body and is oriented with the flash reflector facing an adjacent end of the body. In the operative position, the flash reflector is oriented towards the subject to be photographed. A problem of this camera design, however, is that when the flash unit is in the operative position, it is difficult to manually grasp the camera body to take a picture, without possibly placing your fingers over the flash bulb.

SUMMARY OF THE INVENTION

According to the invention, a photographic camera comprising a camera body having a pair of opposite ends and top, bottom and front faces extending between the opposite ends, a flash unit, and mounting means connecting the flash unit to the camera body for swinging movement relative to the camera body about a pivot axis extending through the top and bottom faces of the body, is characterized in that:

said camera body includes a wedge-shaped portion which is tapered along the front face of the body to one of the opposite ends of the body and has a cut-out common to the top and front faces of the body and the one end;

said flash unit includes a wedge-shaped housing sized to fit into the cut-out substantially flush with the top and front faces and the one end of the camera body in order to be integrated with the wedge-shaped portion; and said mounting means includes integral means for supporting the flash unit in the cut-out to be integrated with the wedge-shaped portion and to swing about the pivot axis to an operative position forward of the front face of the camera body to protrude angularly from the wedge-shaped portion.

Since the flash unit is normally integrated with the camera body, there is provided a readily pocketable camera owing to the wedge design. Moreover, when the flash unit is in its operative position protruding forward angularly from the camera body, a photographer grasping the body to take a picture cannot easily place his or her fingers in front of the flash unit.

DETAILED DESCRIPTION OF THE PREFERRED EMBODIMENT OF THE INVENTION

The invention is disclosed as being embodied preferably in a 35 mm still-picture camera having a pivotable electronic flash unit. Because the features of this type of camera including its flash unit are well known, the description which follows is directed in particular to elements forming part of or cooperating directly with the preferred embodiment. It is to be understood, however, that other elements not shown or described may take various forms known to persons of ordinary skill in the art.

Figure 1:
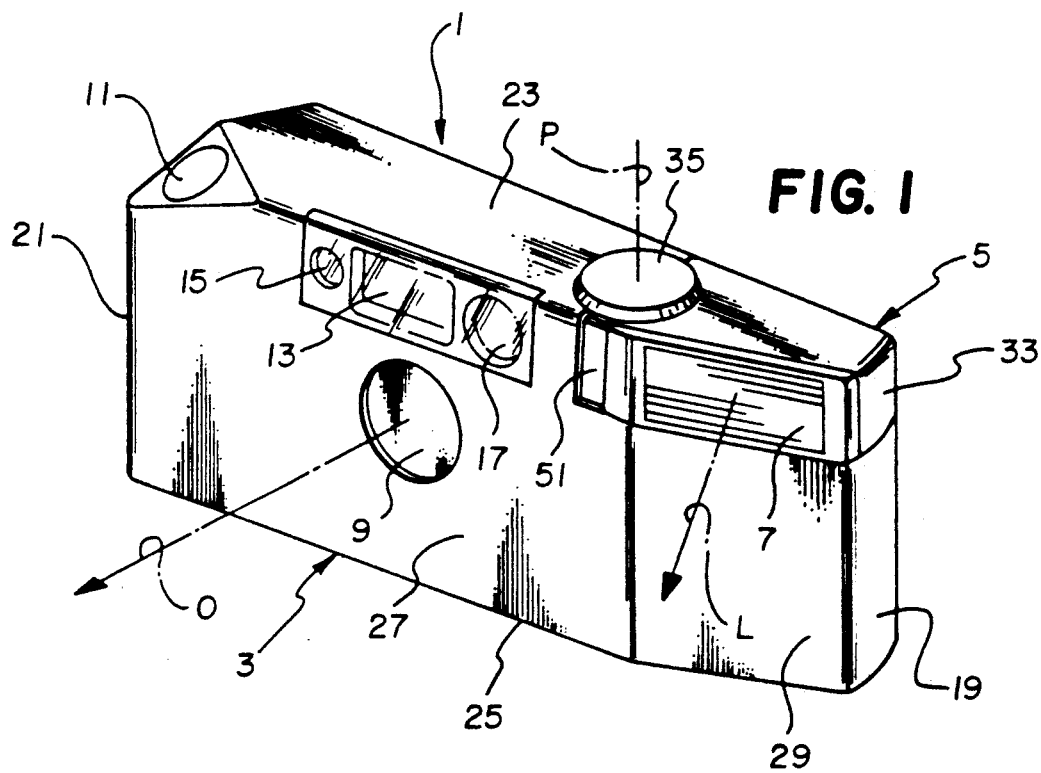
FIG. 1 is a front perspective view of the photographic camera with a pivotable flash unit, showing the flash unit in a storage position.
Figure 2:
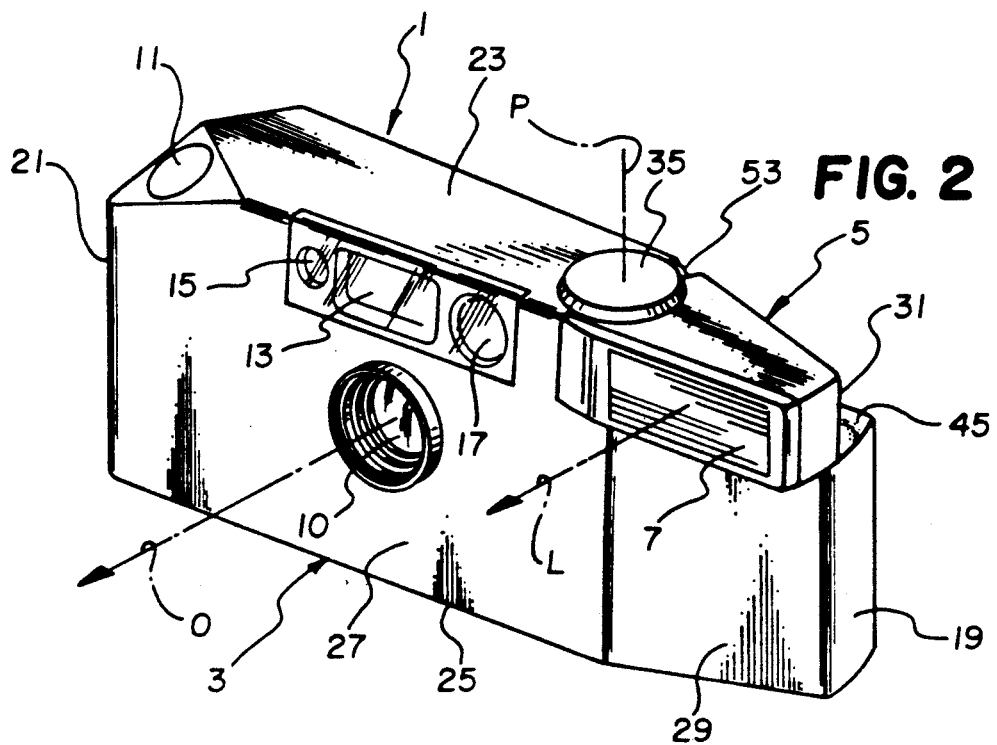
FIG. 2 is a front perspective view similar to FIG. 1, showing the flash unit in an operative or working position.

Referring now to the drawings and in particular to FIGS. 1 and 2, a 35 mm camera 1 is shown comprising a camera body 3, an electronic flash unit 5 having a flash window 7, a lens cover 9 for a taking lens 10, a shutter release button 11, a viewfinder window 13, and respective ambient light admitting windows 15 and 17 for known exposure control and flash control devices (not shown).

The camera body 3 has a pair of opposite ends 19 and 21 and top, bottom and front faces 23, 25 and 27 extending longitudinally between the opposite ends. A wedge-shaped portion 29 of the camera body 3 is tapered along the front face 27 to the one end 19. A cut-out 31, shown only in FIG. 2, is formed in the wedge-shaped portion 29 between the top and front faces 23 and 27 and the one end 19. The flash unit 5 includes a wedge-shaped housing 33 sized to fit completely into the cut-out 31 to be substantially flush with the top and front faces 23 and 27 and the one end 19 in order to be integrated with the wedge-shaped portion 29. See FIG. 1.

Figure 3:
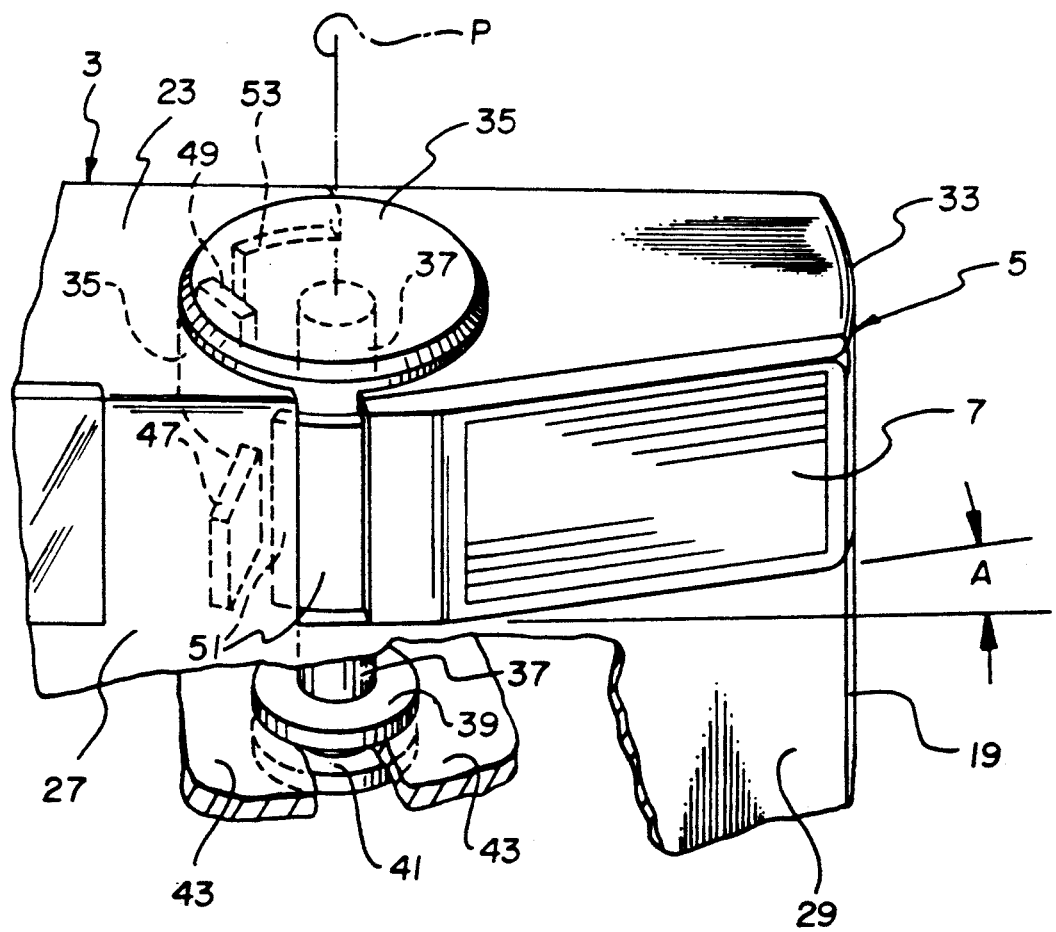
FIG. 3 is a partial perspective view similar to FIG. 1, showing details of a pivot support for the flash unit.

Mounting means connects the flash unit 5 to the camera body 3 for swinging movement relative to the body about a pivot axis P which extends through the top and bottom faces 23 and 25. Specifically, the flash unit 5 includes a cylindrical portion 35 to which is fixed a concentric depending shaft 37. As shown in FIG. 3, the shaft 37 includes a concentric pulley-like member 39 having a circumferential groove 41 in which is received a integral support member 43 of the camera body 3. This arrangement permits the flash unit 5 to be manually swung between a storage position shown in FIGS. 1 and 3 and an operative position shown in FIG. 2. In the storage position, the wedge-shaped housing 33 is integrated with the wedge-shaped portion 29, and a light-emitting axis L of the flash unit 5 extends at an acute angle with respect to an optical axis 0 of the taking lens 10. In the operative position, the wedge-shaped housing 33 is located partially forward of the cut-out 31 to protrude angularly from the wedge-shaped portion 29 in order to prevent a photographer grasping the camera body 3 from placing his or her fingers over the flash window 7, and the light-emitting axis L extends substantially parallel to the optical axis 0. When the wedge-shaped housing 33 is located partially forward of the cut-out 31, it uncovers a ledge portion 45 of the camera body. See FIG. 2.

Respective stop means 47 and 49, shown in FIG. 3, of the camera body 3 are located to alternatively contact integral extensions 51 and 53 of the wedge-shaped housing 33 when the flash unit 5 is in the operative storage positions, to limit swinging movement of the flash unit between the two positions to an acute angle A.

Although not shown, appropriate known linkage means connects the flash unit 5 to the lens cover 9 and to the taking lens 10 to first move the lens cover to uncover the taking lens and to then pop-out the taking lens from the camera body 3 when the flash unit is moved manually from the storage position to the operative position. See FIGS. 1 and 2. Similarly, the linkage means would first retract the taking lens 10 inward of the camera body 3 and then return the lens cover 9 to recover the taking lens when the flash unit 5 is moved manually from the operative position to the storage position.

Since in the storage position the flash unit 5 is integrated with the camera body 3, there is provided a readily pocketable camera owing to the wedge design. When, however, the flash unit 5 is moved manually to the operative position, pocketing is made difficult.

The invention has been described with reference to a Preferred embodiment. However, it will be appreciated that various modifications can be effected with the ordinary skill in the art.

I claim:

1. A photographic camera comprising a camera body having a pair of opposite ends and top, bottom and front faces extending between said opposite ends, a flash unit, and mounting means connecting said flash unit to said camera body for swinging movement relative to the camera body about a pivot axis extending through said top and bottom faces, is characterized in that:
    said camera body includes a wedge-shaped portion which is tapered along said front face to one of said opposite ends and has a cut-out common to said top and front faces and said one of the opposite ends:
    said flash unit includes a wedge-shaped housing sized to fit into said cut-out substantially flush with said top and front faces and said one of the opposite ends in order to be integrated with said wedge-shaped portion; and
    said mounting means includes integral means for supporting said flash unit in said cut-out to be integrated with said wedge-shaped portion and to swing about said pivot axis to an operative position forward of said front face to protrude angularly from the wedge-shaped portion.

2. A photographic camera as recited in claim 1, wherein stop means limits to an acute angle swinging movement of said flash unit from being integrated with said wedge-shaped portion to said operative position.

3. A photographic camera as recited in claim 1, wherein said camera body supports a taking lens having an optical axis, said flash unit has a light-emitting axis, and stop means limits swinging movement of said flash unit to locate its light-emitting axis at an acute angle with respect to said optical axis when the flash unit is integrated with said wedge-shaped portion and to locate its light-emitting axis substantially parallel to the optical axis when the flash unit is in its operative position.

4. A photographic camera comprising a camera body having top and bottom faces, a taking lens, a flash unit, and mounting means connecting said flash unit to said camera body for swinging movement relative to the camera body about a pivot axis extending through said top and bottom faces, is characterized in that:
    said mounting means includes integral means for supporting said flash unit normally in a storage position with a light-emitting axis of the flash unit extending at an acute angle with respect to an optical axis of said taking lens not greater than 45 degrees and otherwise in an operative position with said light-emitting axis extending substantially parallel to said optical axis.

5. A photographic camera as recited in claim 4, wherein said camera body has a cut-out dimensioned to include said flash unit to integrate the flash unit with the camera body when the flash unit is in its storage position, and said integral means supports said flash unit to permit the flash unit to protrude forward of said camera body when the flash unit is in its operative position.

6. A photographic camera as recited in claim 5, wherein said camera body at least in the vicinity of said cut-out and said flash unit are each wedge-shaped.

* * * * *